(No Model.) 3 Sheets—Sheet 1.
C. T. WELCH.
Addressing Machine.
No. 236,387. Patented Jan. 4, 1881.
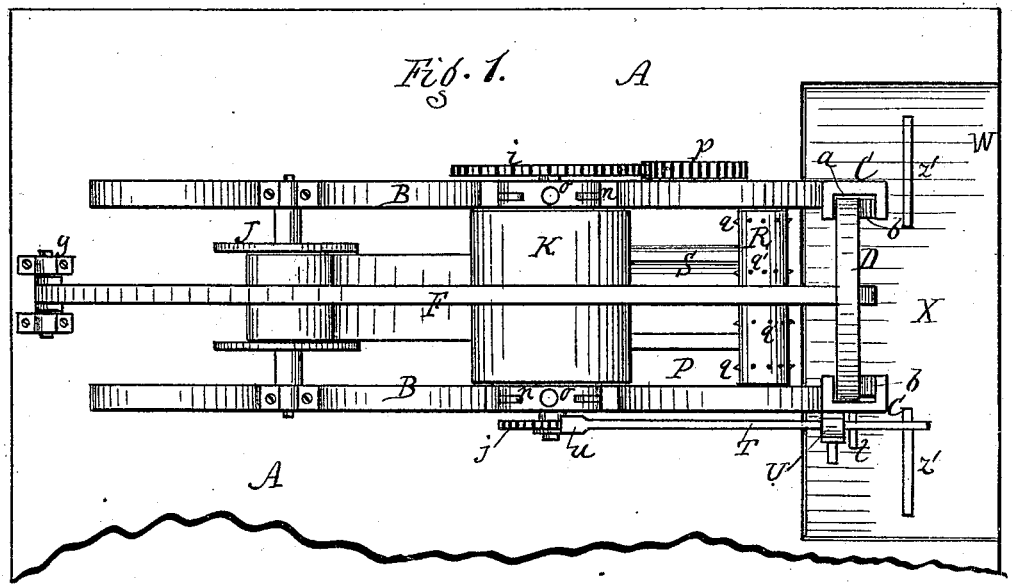
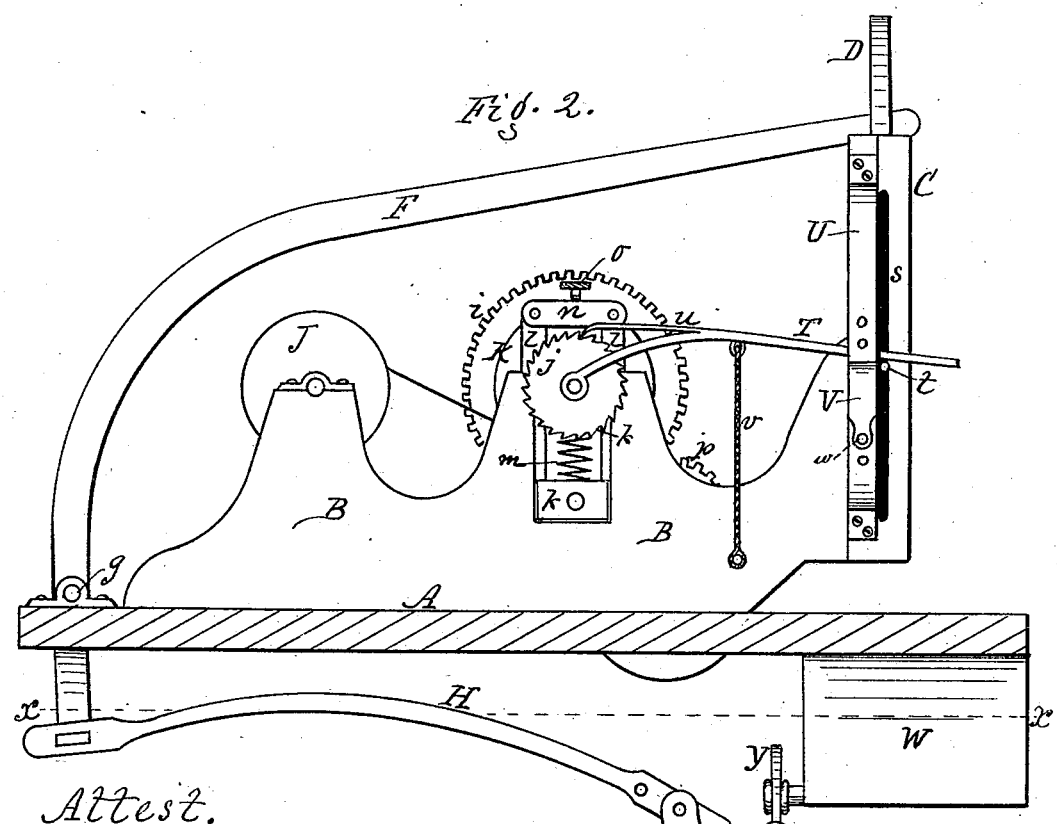
Attest.
John C. Bund
R. E. White
Inventor
Chas. T. Welch,
per R. E. Osgood,
Atty.

(No Model.) 3 Sheets—Sheet 2.
C. T. WELCH.
Addressing Machine.
No. 236,387. Patented Jan. 4, 1881.
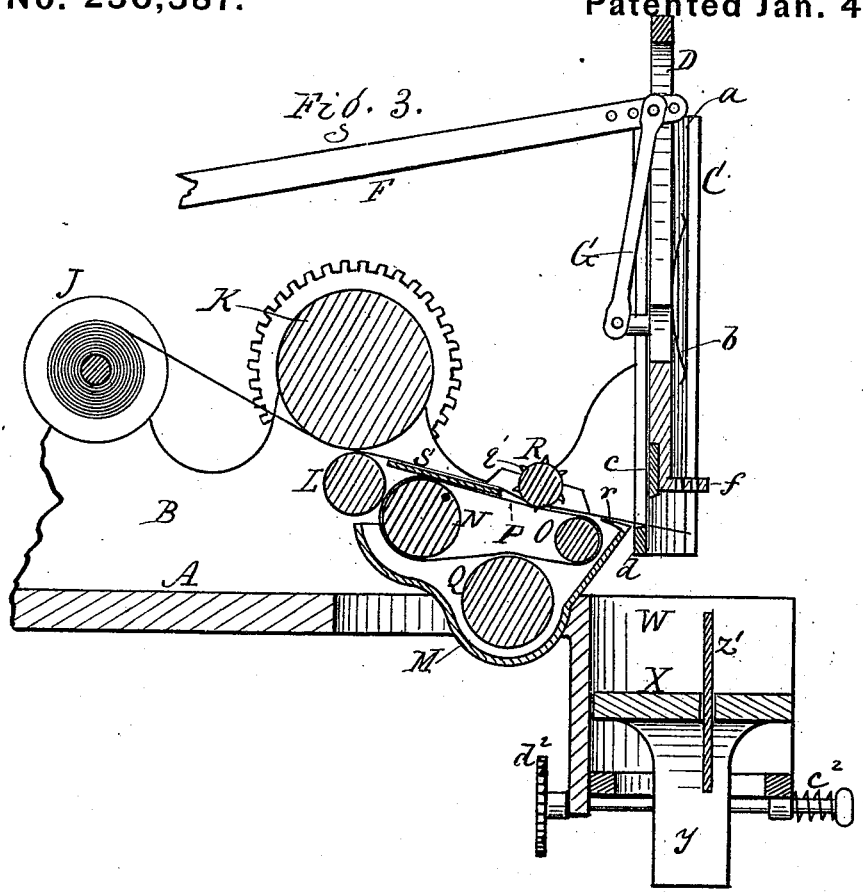
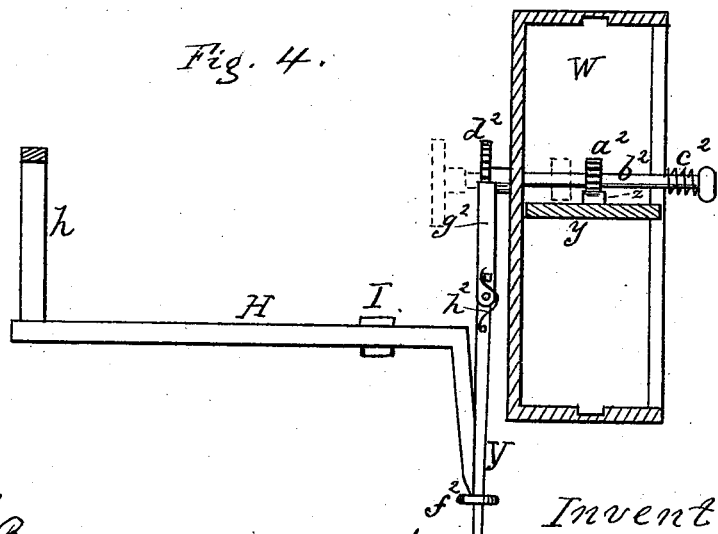
Attest.
John C. Burns
R. E. White
Inventor.
Chas T. Welch,
per R. T. Osgood,
Atty.

(No Model.)     3 Sheets—Sheet 3.

C. T. WELCH.
Addressing Machine.

No. 236,387.    Patented Jan. 4, 1881.

Attest.
John V. Bumb.
R. E. White.

Inventor.
Chas T. Welch,
per R. L. Osgood,
Atty.

UNITED STATES PATENT OFFICE.

CHARLES T. WELCH, OF BELLONA, NEW YORK.

ADDRESSING-MACHINE.

SPECIFICATION forming part of Letters Patent No. 236,387, dated January 4, 1881.

Application filed April 6, 1880. (No model.)

*To all whom it may concern:*

Be it known that I, CHARLES T. WELCH, a citizen of the United States, residing at Bellona, Yates county, New York, have invented a certain new and useful Improvement in Addressing-Machines; and I do hereby declare that the following is a full, clear, and exact description of the same, reference being had to the accompanying drawings, in which—

Figure 5:
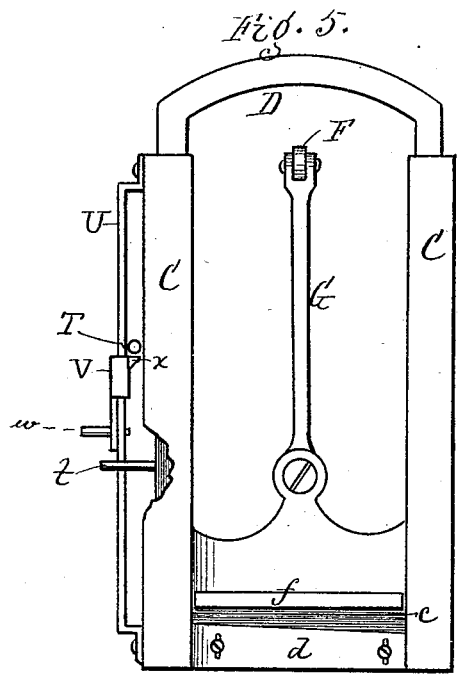
Figure 6:
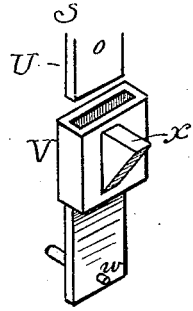
Figure 7:
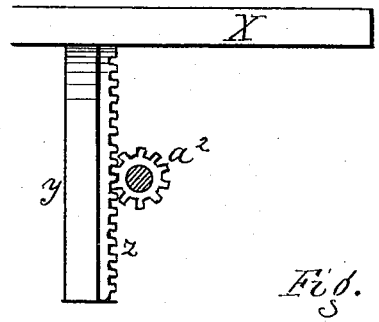
Figure 8:
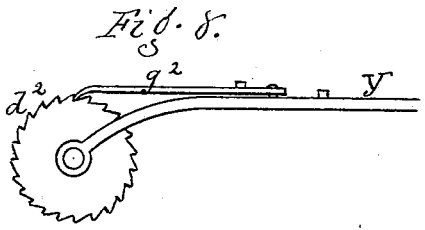
Figure 9:
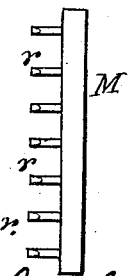

Figure 1 is a plan of the machine. Fig. 2 is a side elevation. Fig. 3 is a longitudinal vertical section. Fig. 4 is a horizontal section on line $x\ x$ of Fig. 2, looking downward. Fig. 5 is a front elevation of the head-frame and sliding gate. Figs. 6, 7, 8, and 9 are detail views.

My improvement relates to machines for addressing newspapers and other papers; and it consists in the construction and arrangement of parts hereinafter more fully described and claimed.

In the drawings, A represents a table or frame, which is mounted on legs to support the parts. B is the frame of the machine, which is secured on top of the table, and C is a vertical head-frame or way, in which slides the gate or carrier which carries the knife. This head-frame consists of two upright standards having grooves $a\ a$, in which the gate rests.

D is the gate or carrier, resting in the frame and pressed back against the rear or inner sides of the grooves by means of bow-shaped flat springs $b\ b$, which rest between the gate and the front sides of the grooves, thereby keeping the gate tight to its work.

$c$ is the knife, attached to the bottom of the gate, and $d$ is a shear-plate, attached at the bottom of the standards B B, so that the knife, in passing the shear-plate, will be pressed close up to its work to produce a perfect cut. The shear-plate is made somewhat inclined on its upper edge in order to produce a shearing cut, and it is also made adjustable up and down by means of slots through which pass set-screws, securing it in place. The springs $b\ b$, by being made in the form described and located in the grooves of the frame, ride easily up and down with the gate and always hold the knife up to its work, so that the cut of the knife will be perfect.

$f$ is a platen or follower, located on a level with or just above the edge of the knife and projecting out horizontally from the lower end of the gate. As the slip is cut from the strip this platen catches it, carries it down, and presses it upon the paper below, the strip having been previously gummed or pasted, as will presently be described. The body of the platen is filled with perforations to allow escape of imprisoned air as the platen presses upon the paper.

F is a curved arm, similar in shape to a sewing-machine needle-arm. This arm is pivoted at $g$ at the rear of the machine, and with its front end is connected a pitman, G, pivoted at the lower end to the gate D, by which said gate is operated. The rear end of the arm passes through the table, and at the bottom extends out laterally and horizontally, as shown at $h$, Fig. 4. To this lateral extension is attached an arm, H, forming a crank-arm, and to this crank-arm is pivoted a pitman, I, extending to the bottom of the machine and connected with a treadle. (Not shown in the drawings.) By this means the arm and the gate are driven by the foot of the operator.

J is a reel, upon which is coiled the paper strip containing the addresses in successive order which are to be cut and pasted upon the papers.

K and L are two feeding-rollers, between which the paper strip is fed to the pasting apparatus. The upper roller is of considerable size, and on one end of its shaft is a spur-gear wheel, $i$, while on the other end is a ratchet-wheel, $j$, all clearly shown in Figs. 1 and 2. The small roller L has no gear, but is turned by the friction. The journals of both these rollers rest in boxes $k\ k$, Fig. 2, which slide on bars $l\ l$, forming ways, and the boxes are pressed apart to admit the paper strip between them by means of spiral springs $m\ m$. The bars $l\ l$ at the top are pivoted to head-blocks $n\ n$, and through these head-blocks pass set-screws $o\ o$, which press down on top of the boxes of the upper roller, K. By this means it will be perceived the boxes of the two rollers may be pressed toward each other to produce the desired pressure on the paper strip to feed it forward, and yet the rollers will be forced apart to a certain extent by the spiral springs between the boxes, before described.

M is a cup, forming a paste or water cup, which is set into a hole in the table in front of the feeding-rollers above described, and between them and the cutting apparatus, said cup being set into place from below. N is a roller in the upper rear portion of this cup, near the lower feed-roller, L, and so located as to receive the paper strip above it. On one end of the shaft of this roller is a spur-pinion, $p$, which gears with the spur-wheel $i$ and receives its motion from it. O is a small roller at the opposite end of the cup and near the cutting apparatus. Around these two rollers passes an endless rubber band or apron, P, which receives forward motion by the roller N.

Q is a roller in the deepest part of the cup, and midway between the rollers N O. This roller Q is free to move up and down by its own accord; but it has short journals, which rest in vertical grooves in the sides of the cup, by which it is kept in proper position. It bears against the under side of the rubber band which passes over it, and when paste or water is in the tank it wets the surface of the band, which, when it passes over, also correspondingly wets the bottom of the paper slip that passes over the band. Being free in its movements, said roller Q will always adapt itself to the band, and will be sure to properly cover the same with paste or water.

R is a small roller, located above the band between the rollers N O. It has on its periphery two sets of sharp-pointed spurs, $q$ $q'$, at each end. The outer set of spurs, by striking into the rubber band, impart motion to the roller, while the inner set of spurs, by striking into the paper slip, give forward motion to the slip itself and keep the latter taut and straight upon the apron, so as to get the best effect of the pasting or wetting action. I would say here that either paste or water may be used in the cup. In case the paper slip is ungummed, then paste is used in the cup to paste the under surface of the slip to render it adhesive; but in case the slip is previously gummed preparatory to use, then water is used in the cup simply to moisten the gum. The two sets of spurs in roller R are quite essential to feed the slip forward and prevent it from wrinkling under these circumstances. The rear or outer edge of the cup is provided with a series of teeth, $r$ $r$, which project back close to the turn of the endless band and bridge over the space between the apron and the shear-plate, said teeth receiving the end of the slip as it moves forward, preventing it from falling into the throat at the end of the band and conveying it properly to the cutting apparatus.

S is a plate, forming a guideway to the paper strip as it issues from the feeding-rollers to the pasting-band, said guideway carrying the strip over the throat at the junction of the rollers L N and conveying it to the pressure-roller R.

T is a rock-arm, jointed to turn on the axis of ratchet-wheel $j$, said arm projecting outward and passing through a guideway, U, secured to the upright head-frame C. In the standard is made a long vertical slot, $s$, Fig. 2. A pin, $t$, attached to the gate passes through this slot and rests under the rock-arm T. It will be seen that as the gate moves up and down the rock-arm will correspondingly be raised and lowered in the guideway U.

$u$ is a spring-pawl resting on the arm T and engaging with the teeth of the ratchet-wheel. In every up motion of the rock-arm the ratchet-wheel will be moved forward by the pawl, and in every down motion the pawl will retract to obtain a new hold.

$v$ is a rubber or other spring attached to the rock-arm and the frame for the purpose of producing the reaction of the rock-arm.

V is a gage-slide attached to the guideway U, and capable of adjustment higher or lower thereon by means of a pin, $w$, on its bottom, which strikes into any of a series of holes in the guideway, or by other means. This gage-slide has a stop, $x$, which rests in the guideway under the rock-arm and stops the rock-arm in its downward motion, at whatever height the gage may be set. By this means the pawl $u$ may be made to move the ratchet forward either one or two or more teeth at each throw, as may be desired, thereby also making a correspondingly greater or less movement of the paper slip, to enable a greater or less width to be cut by the knife, which is necessary in addresses of greater or less width.

W is a square cavity or socket of considerable depth beneath the cutting apparatus, said cavity being formed in the table for the purpose of receiving a pile of the papers on which the addressed labels are to be pasted. X is a follower or bed in said cavity, which forms the support for the papers. The ends of the follower have tenons which run in vertical grooves of the frame to enable the follower to move up and down, or they are otherwise prepared to allow vertical movement of the follower. $y$ is a vertical bar on the under side of the follower, and $z$ is a rack-bar attached to it.

$a^2$ is a pinion which engages with the rack, and is located on a shaft, $b^2$, by which motion is imparted to it. The shaft is capable of end motion in order to throw the pinion out of engagement with the rack, as indicated by the dotted lines in Fig. 4. This allows the follower to be run down to the bottom of the cavity after it has been elevated. The shaft $b^2$ has a spring, $c^2$, on the outer end to retract the shaft.

$d^2$ is a ratchet-wheel on the inner end of shaft $b^2$.

Y is a rock-arm, jointed at one end to turn on shaft $b^2$, the other end extending outward and passing through a loop, $f^2$, on the end of arm H.

$g^2$ is a pawl on the arm Y, which engages with the ratchet-wheel $d^2$ and gives motion to it at each reciprocation of the operating-arm F, thereby raising the follower X step by step. The pawl $g^2$ is pivoted at the rear end, so that it can be turned off sidewise to disengage from the ratchet, in which case the follower may be held stationary for the purpose of labeling separate papers when desired. The pawl is held in engagement with the ratchet by a spring, $h^2$.

$Z'$ $Z'$ are division-plates which pass through the follower X, resting in slots therein, the plates being stationary while the follower slides over them. The object of these plates is to enable smaller papers to be held in place than would occupy the whole surface of the follower. Small papers may be placed in the space between the division-plates and the back of the chamber, while large ones may occupy the whole chamber by simply removing the division-plates.

From the above description the operation will be readily understood. The strip of paper having the addresses printed thereon in successive order is fed through the feed-rollers and drawn to the cutting apparatus by the spur-pointed roller R and the endless band, and in its passage is pasted or wet on the under side. The knife cuts each address-slip from the strip, and the platen $f$ carries it down and pastes it upon the paper. A pile of the papers is placed in the cavity W on the follower X, which latter feeds up as fast as the papers are addressed and removed.

By the use of the gage V the feeding motion of the strip can be changed to cut wide or narrow labels.

By taking hold of the spur-wheel $i$ and moving it forward the ratchet $j$ will slip under its pawl, and additional feeding motion will be given to the paper strip in proportion to the movement imparted to the wheel.

It is frequently the case that wide addresses are interspersed with or follow narrow ones, and the operator, by watching the feeding of the strip, can turn the wheel by hand at any time, so as to compensate for the difference in width, and thereby prevent the mutilation of the addresses.

Having thus described my invention, what I claim as new, and desire to secure by Letters Patent, is—

1. In an addressing-machine, the combination, with the feeding-rollers K L and band-roller N, said rollers K N being provided with the gear-wheels $i$ $p$, the ratchet-wheel $j$ on the shaft of roller K, the rock-arm T and pawl $u$, engaging with the ratchet, the guideway U, through which the end of the rock-arm passes, the pin $t$, attached to the gate and resting under the arm for elevating it, and the gage-slide V, adjustable to different positions on the guideway and provided with the stop $x$ to gage the downward movement of the rock-arm, as herein shown and described.

2. In an addressing-machine, the cup M, containing the rollers N O Q R, and provided with the teeth $r$, bridging the space between the endless band and cutting apparatus, as herein shown and described.

3. In an addressing-machine, the combination, with the endless band P, running over the rollers N O and gummed or wetted by the roller O, of the pressure-roller R, provided with the two sets of spurs $q$ $q'$, one set of which engages with the endless band to transfer motion from the band to the roller and the other set of which engages with the paper slip to transfer motion from the roller to the slip, as herein shown and described.

In witness whereof I have hereunto signed my name in the presence of two subscribing witnesses.

CHARLES T. WELCH.

Witnesses:
D. S. YORK,
W. H. COLEMAN.